T. E. BREAKEY.
AUTOMATIC GATE.

No. 189,300.  Patented April 10, 1877.

Witnesses:
Thomas Lyon.
Wm J. Webster.

Inventor.
Thomas E. Breakey.

UNITED STATES PATENT OFFICE.

THOMAS E. BREAKEY, OF HOMER, MICHIGAN.

IMPROVEMENT IN AUTOMATIC GATES.

Specification forming part of Letters Patent No. 189,300, dated April 10, 1877; application filed August 17, 1874.

To all whom it may concern:

Be it known that I, THOMAS E. BREAKEY, of Homer, in the county of Calhoun and State of Michigan, have invented certain new and useful Improvements in Automatic Gate-Hinge; and I do hereby declare the following to be a full, clear, and exact description thereof, reference being had to the accompanying drawings, forming part of this specification, and in which—

Figure 1:
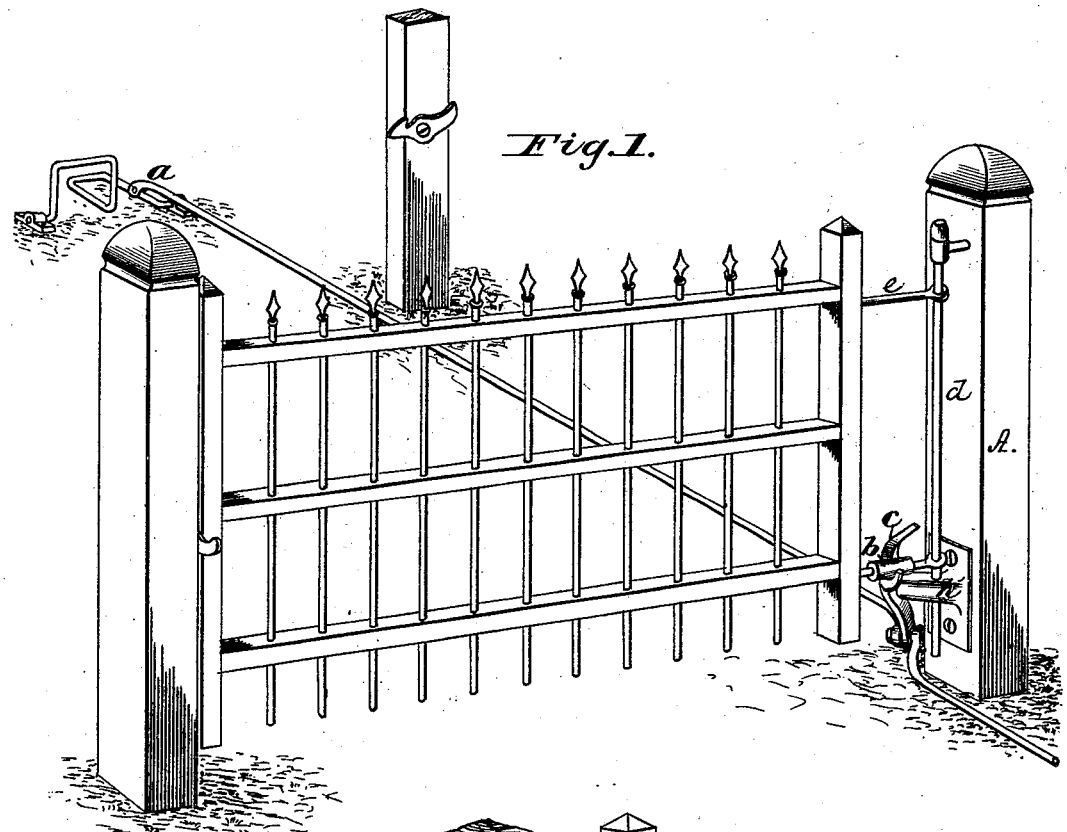
Figure 2:
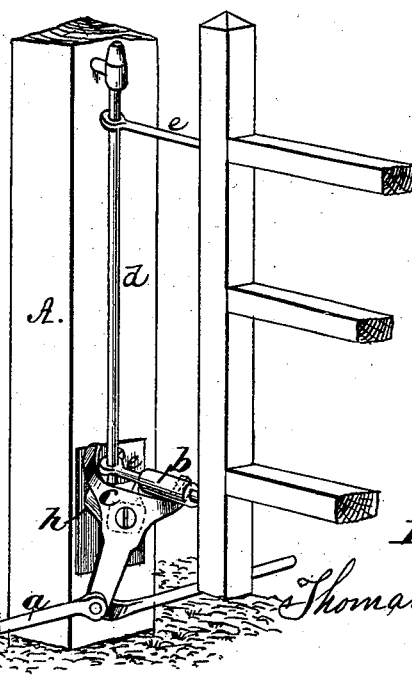

Figure 1 is a perspective view of a gate embodying my improvements. Fig. 2 is an enlarged detail view of the same.

A represents the post, to which the gate is hinged by means of the connecting-rods $e$ and upright rod $d$, the lower one of said connecting-rods $e$ being provided with a roller, $b$, as shown in the drawing. $c$ represents a reciprocating lever, pivoted at the upper part to a projecting arm, $h$, on the post A, said lever being constructed of a semicircular shape on its upper part, within the circumference of which the roller $h$ moves, while the lower end of said lever is pivoted to and operated by the connecting-bars $a$ of the usual road-bed wheel-iron lever, all as fully shown and explained by the drawings.

It will be observed that, the reciprocating lever $c$ being a reversible incline, upon which the roller $b$ moves by force of gravity, the gate can be readily opened or closed by alternately operating the rods $a$ by means of the wheel-iron or hand-levers.

What I claim as new and useful is—

The reciprocating lever $c$, provided with a semicircular-shaped head, and pivoted to the projection $h$, as shown, in combination with the roller $b$, connecting-rods $e$, upright rod $d$, and rods $a$, and the wheel-iron lever, the several parts operating substantially as and for the purpose described.

THOMAS E. BREAKEY.

In presence of—
THOMAS LYON,
WM. J. WEBSTER.